United States Patent
Peled et al.

(10) Patent No.: US 12,067,902 B2
(45) Date of Patent: Aug. 20, 2024

(54) SYSTEM AND METHOD FOR PROCESSING BOOLEAN AND GARBLED CIRCUITS IN MEMORY-LIMITED ENVIRONMENTS

(71) Applicant: Fireblocks Ltd., Tel Aviv-Jaffa (IL)

(72) Inventors: Udi Peled, Tel Aviv (IL); Nikolaos Makriyannis, Tel Aviv (IL); Idan Ofrat, Tel Aviv (IL); Pavel Berengoltz, Tel Aviv (IL)

(73) Assignee: Fireblocks Ltd., Tel Aviv-Jaffa (IL)

( * ) Notice: Subject to any disclaimer, the term of this patent is extended or adjusted under 35 U.S.C. 154(b) by 237 days.

(21) Appl. No.: 17/456,762

(22) Filed: Nov. 29, 2021

(65) Prior Publication Data

US 2022/0172647 A1     Jun. 2, 2022

Related U.S. Application Data

(60) Provisional application No. 63/119,247, filed on Nov. 30, 2020.

(51) Int. Cl.
*G09C 1/00*     (2006.01)

(52) U.S. Cl.
CPC ..................... *G09C 1/00* (2013.01)

(58) Field of Classification Search
None
See application file for complete search history.

(56) References Cited

U.S. PATENT DOCUMENTS

2014/0040614 A1*  2/2014  Kolesnikov ......... G06F 21/6245
                                                       713/164

* cited by examiner

*Primary Examiner* — Brandon Hoffman
(74) *Attorney, Agent, or Firm* — M&B IP Analysts, LLC (57) ABSTRACT

A system and method for processing garbled circuit techniques in memory-limited environments. The method includes: initializing a plurality of input gates and a plurality of state gates; generating a circuit slice for an update function; setting the plurality of state gates as a plurality of new output-state-gates; and generating a circuit slice for a finalization function, wherein the finalization function represented by a sub-circuit, the outputs of which are terminal gates.

15 Claims, 10 Drawing Sheets

SYSTEM AND METHOD FOR PROCESSING BOOLEAN AND GARBLED CIRCUITS IN MEMORY-LIMITED ENVIRONMENTS

CROSS-REFERENCE TO RELATED APPLICATIONS

This application claims the benefit of U.S. Provisional Application No. 63/119,247 filed on Nov. 30, 2020, the contents of which are hereby incorporated by reference.

TECHNICAL FIELD

The present disclosure relates generally to data security and cryptography and, in particular, to systems and methods for using garbled circuit techniques in memory-limited environments.

BACKGROUND

As digital communications create new opportunities for businesses, organizations, and individuals, the risks posed by data breaches and other security threats continue to increase. Individuals, organizations, and businesses may seek to protect sensitive data and communications, including by application of various cryptographic techniques. Cryptography provides for the security of data and communications by the application of various algorithms, processes, and the like. One such technique, circuit garbling, applies to the securitization of Boolean circuits, providing for generation of a single output, from two, separate inputs, via a secure process, where each input is provided by a separate, isolated source or device. Boolean circuits, and the garbling thereof, are described with respect to FIGS. 1A-1C, providing for an enhanced understanding of the techniques involved and the limitations thereof.

Figure 1A:
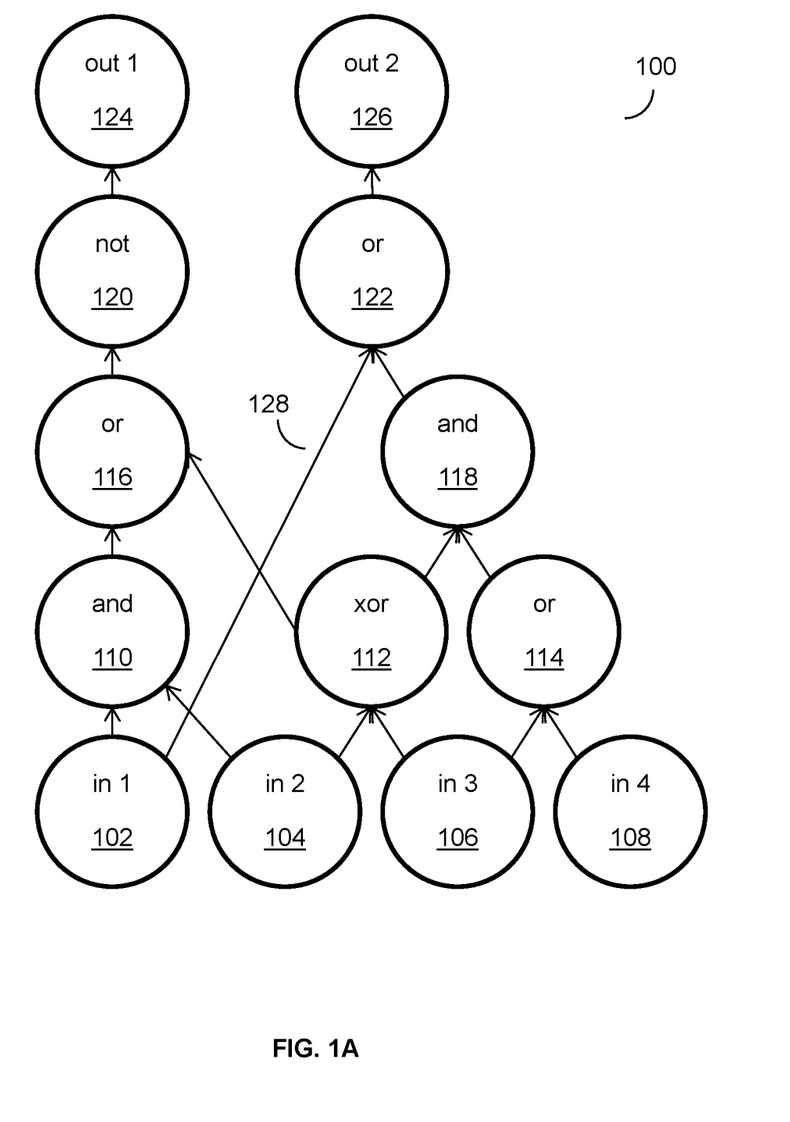
FIG. 1A is a gate diagram depicting a Boolean circuit.
Figure 1B:
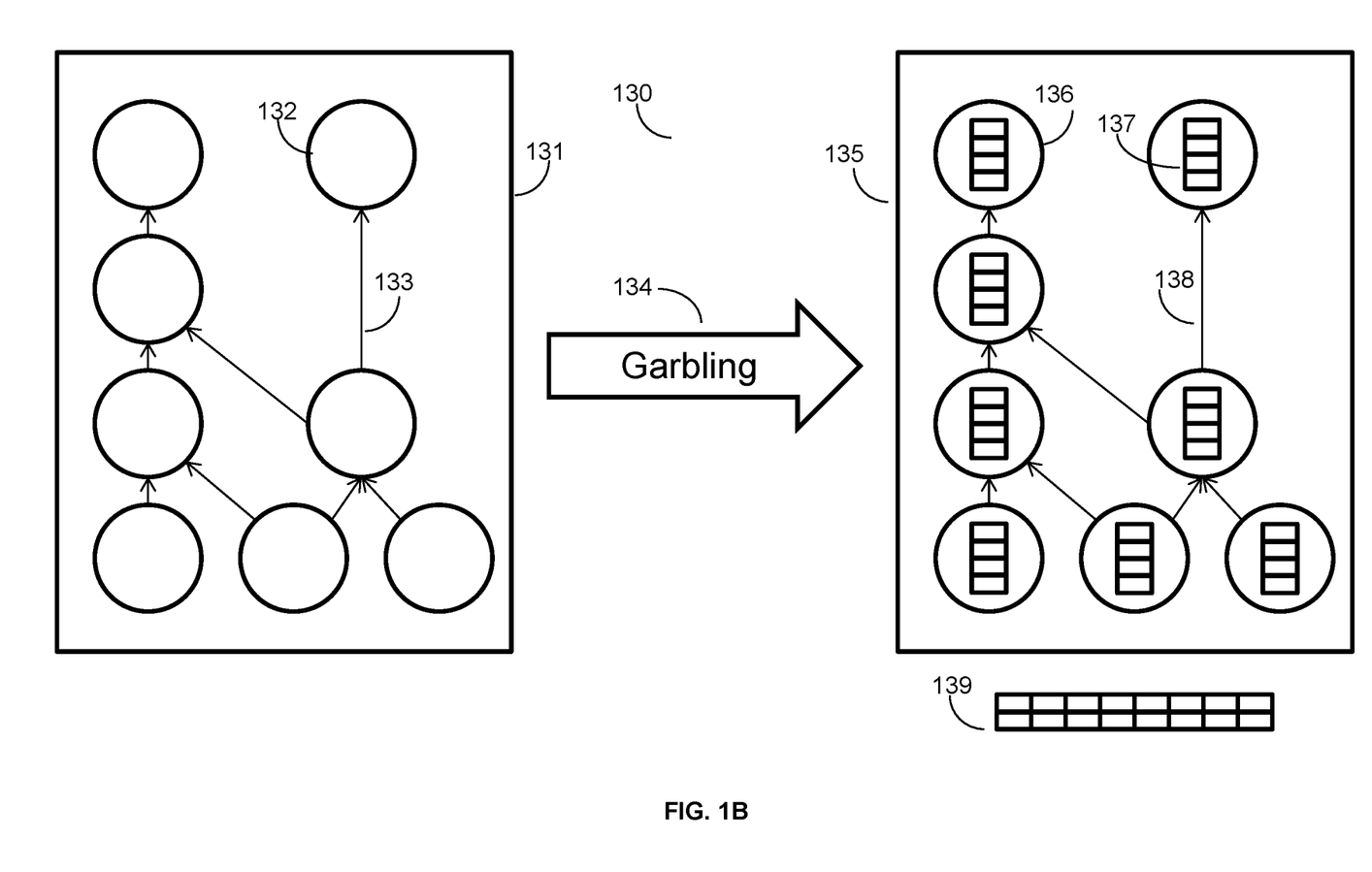
FIG. 1B is an illustration depicting the garbling of a Boolean circuit into a garbled circuit.
Figure 1C:
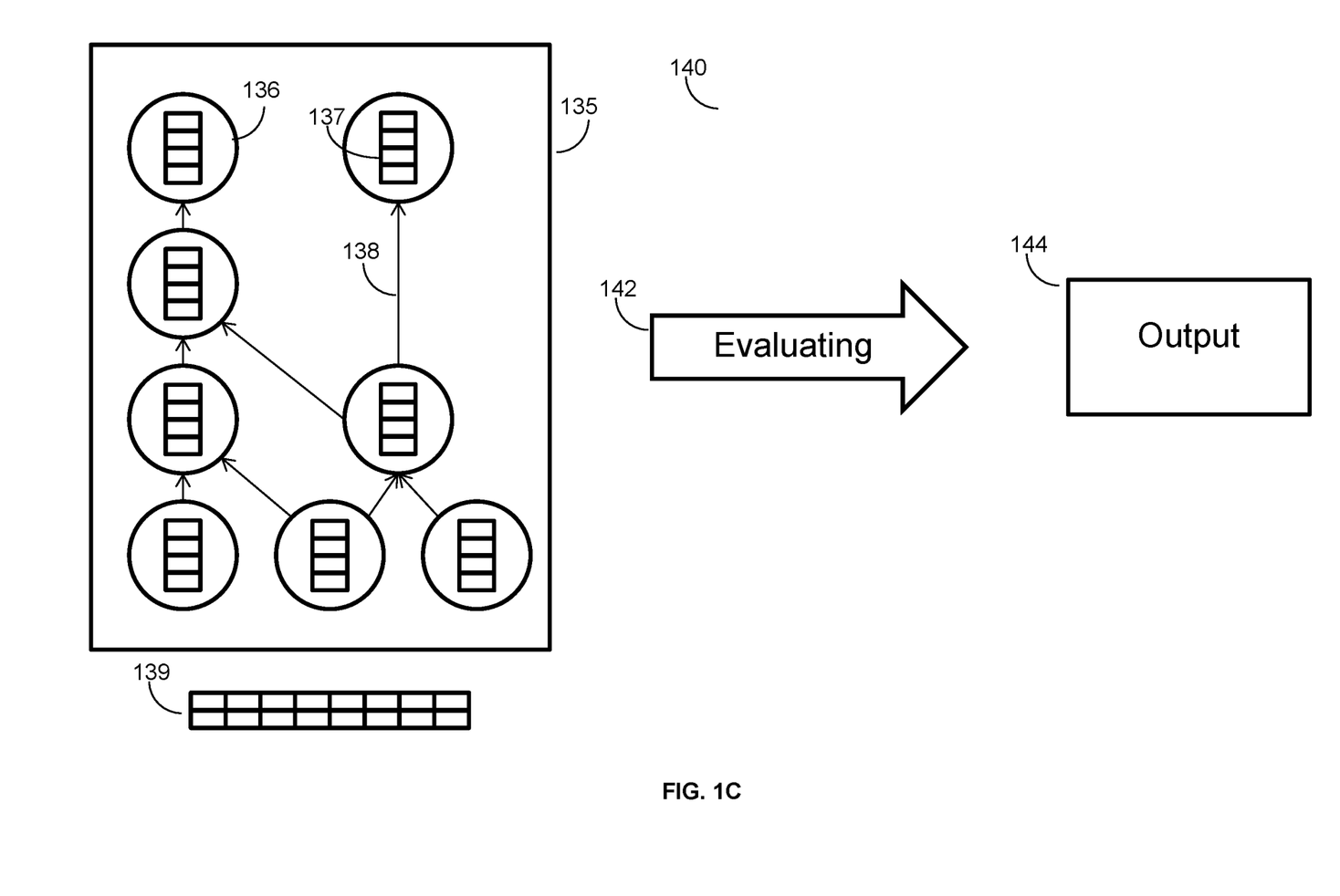
FIG. 1C is an illustration depicting the evaluation of a garbled circuit into an output.

Garble-and-evaluate techniques, such as those described with respect to FIGS. 1A-1C, may be applicable to authentication of application programming interface (API) requests. Various APIs may be configured to assign API secrets to users, where users may execute various API requests using the users' assigned API secrets, providing for service provider verification of users' requests. API service providers may employ various cryptographic keys, as may be included in the assigned API secrets, and authentication of API requests may be enabled by sharing users' assigned API secrets between various devices and signing requests or messages by executing garble-and-evaluate techniques between the devices.

In addition, garble-and-evaluate techniques may be applicable to further secure computation schemes, including three-party protocols, single-evaluator protocols, and the like, where such protocols include the basic, memory-intensive element of generating, garbling, and evaluating Boolean circuits, as described hereinbelow. The memory-intensive nature of such operations may be so pronounced as to require memory allocations of more than two orders of magnitude greater than those required for non-garbled evaluation of the same Boolean circuits.

FIG. 1A is a gate diagram depicting a Boolean circuit 100. A Boolean circuit 100 includes of a series of gates, 100 through 126, connected via links 128. The links 128 provide for communication of input and output values to and from the various gates, 100 through 126. Although only a single link 128 is so labeled, it may be understood that all other links 128 may be likewise labeled. Further, Boolean circuits 100 may be implemented as physical wire-and-component circuits, as digital or virtualized circuits, and the like, as well as any combination thereof.

A Boolean circuit 100 may be configured to represent a mathematical function or algorithm with inputs and outputs of a fixed length. In the example circuit 100 shown in FIG. 1A, the circuit 100 is configured with four input gates, 102 through 108, two output gates 124 and 126, and seven computing gates, 110 through 122, variously interconnected with one or more links 128. The computing gates, 110 through 122, are configured as various Boolean logic operators, providing logical operation on inputs via functions including, without limitation, "or," "and," "not," and the like, as well as any combination thereof. The computing gates, 110 through 122, may be configured to accept one or more inputs and to yield one or more outputs.

As an example, provided with respect to the left-most gate-and-link chain of the Boolean circuit shown with respect to FIG. 1C, values from a first input gate 102 and a second input gate 104 are introduced to an "and" computing gate 110, which produces an output with a value common to both the first input gate 102 and the second input gate 104. Next, the output of the "and" computing gate 110 is provided as an input into an "or" computing gate 116, as well as the output of an "exclusive or" computing gate 112, which outputs a value exclusive to either the second input gate 104 or the third input gate 106, but not both. The "or" computing gate 116 outputs a value of either the output of the "and" computing gate 110 or the output of the "exclusive or" computing gate 112, or both, where the output of the "or" computing gate 116 is the input of the "not" computing gate 120. The "not" computing gate 120 inverts the value of the input, providing, to the first output gate 124, a value opposite the output of the "or" computing gate 116. Where the Boolean circuit 100 is configured to yield first and second outputs, the value of the first output gate 124 and the second output gate 126 are determined as described.

FIG. 1B is an example illustration 130 depicting the garbling 134 of a Boolean circuit 131 into a garbled circuit 135 In the garbling process, a first "garbling" party may analyze, in depth-first order, the various gates 132 included in a garbling circuit 131, creating, for each gate 132, a corresponding garbled gate 136 and encryption table 137. The garbled circuit 135 resulting from the application of the garbling technique 134 to the Boolean circuit 131 may further include auxiliary information 139, which may provide, without limitation, information relevant to decoding processes, as may be described with respect to FIG. 1C.

It may be understood that the garbling process 134 may include the introduction of additional data features not included in the Boolean circuit 131, such as a random seed, and that each garbled gate 136 of the garbled circuit 135 may be solely dependent on the various connecting links 138. It may be further understood that, while only one of each of the gates 132, gate links, garbled gates 136, encryption tables 137, and garbled links 138, are labeled for purposes of simplicity, other, like, features may be correspondingly labeled without loss of generality or departure from the scope of the disclosure.

FIG. 1C is an example illustration 140 depicting the evaluation 142 of a garbled circuit 136 into an output 144. The evaluation 142 of a garbled circuit 136 may provide for computation, by a second, evaluating party, of a Boolean circuit, garbled, as described with respect to FIG. 1B, by a first party, of the output 144 of the circuit based on the first and second parties' joint inputs. The evaluating process 144 may include gate-by-gate decryption, in depth-first order, of the various gates 136 and encryption tables 137 included in the garbled circuit 135, rendering, in combination with the auxiliary information 139, an output 144. It may be understood that while only one of each of the garbled gates 136, encryption tables 137, and links 138, are labeled for purposes of simplicity, that other, like, features may be correspondingly labeled without loss of generality or departure from the scope of the disclosure.

The garbling and evaluation of Boolean circuits, described with respect to FIGS. 1A-1C, provides for computation of a function's output, based on inputs from two isolated parties, in a manner which prevents passive attackers from discovering any information regarding the parties' inputs. However, such techniques may be memory-intensive, limiting the environments in which such techniques may be properly executed. To enable secure execution of various functions, trusted execution environments (TEEs), such as Intel® SGX and ARM® TrustZone, provide parallel, isolated execution environments, preventing malicious executions, operating in the TEE, from reaching and negatively-impacting, a main execution environment. However, many TEEs may be memory-limited, restricting the execution or performance of various operations. While certain solutions provide for execution using external, unsecured memory, such solutions fail to integrate the same security advantages inherent to the TEE and fail to integrate cryptographic mechanisms, such as garble-and-evaluate techniques, which provide for securing a TEE while harnessing external memory.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for processing garbled circuit techniques in memory-limited environments. The method comprises initializing a plurality of input gates and a plurality of state gates; generating a circuit slice for an update function; setting the plurality of state gates as a plurality of new output-state-gates; and generating a circuit slice for a finalization function, wherein the finalization function represented by a sub-circuit, the outputs of which are terminal gates.

In addition, certain embodiments disclosed herein include a system for processing garbled circuit techniques in memory-limited environments. The system for processing garbled circuit techniques in memory-limited environments. The system includes a processing circuitry; and a memory, the memory containing instructions that, when executed by the processing circuitry, configure the system to: initialize a plurality of input gates and a plurality of state gates; generate a circuit slice for an update function; set the plurality of state gates as a plurality of new output-state-gates; and generate a circuit slice for a finalization function, wherein the finalization function represented by a sub-circuit, the outputs of which are terminal gates.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 2:
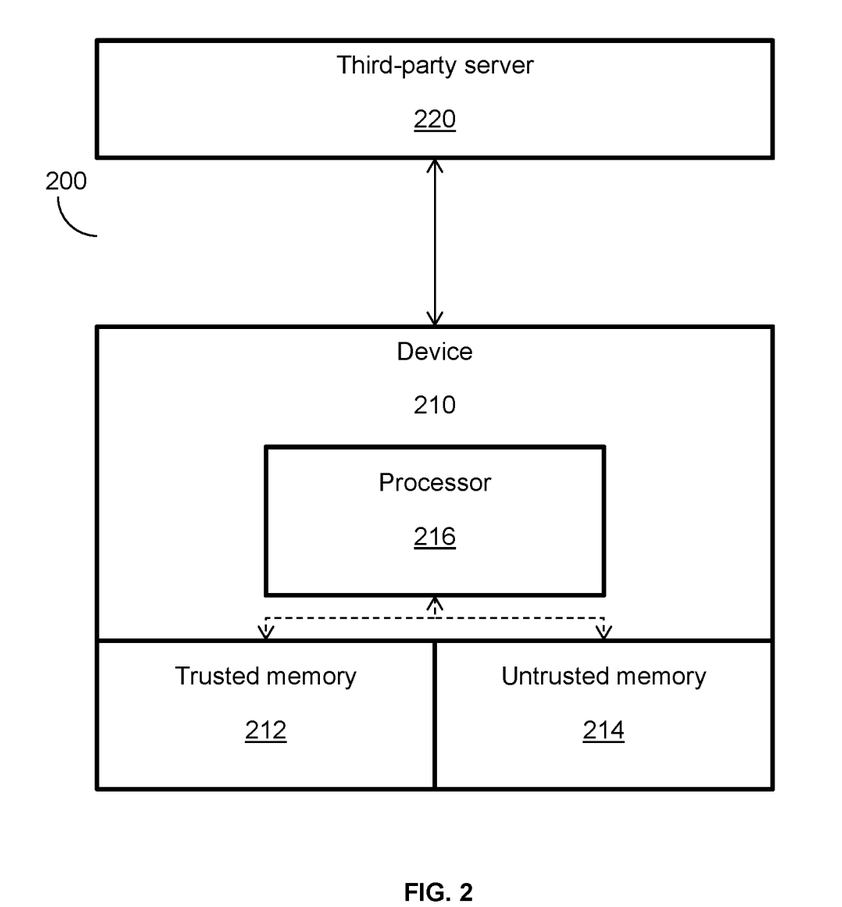
FIG. 2 is a network diagram depicting a relationship between a circuit-slicing device and a third-party server, according to an embodiment.

FIG. 2 is an example network diagram 200 depicting a relationship between a circuit-slicing device 210 and a third-party server 220, according to an embodiment. The circuit-slicing device 210 may be a secure device similar or identical to the secure device, 210, of FIG. 3, below. A circuit-slicing device 210 is described with respect to FIG. 7, below.

The circuit slicing device 210 may be a device configured to execute one or more circuit slicing or processing methods, including those described hereinbelow. The circuit slicing device 210 may include a processor 216, a trusted memory 212, an untrusted memory 214, and the like, as well as any combination thereof. The circuit-slicing device 210 may be configured to connect with the third-party server 220 via one or more means including, without limitation, wired connections, such as universal serial bus (USB), ethernet, and the like, wireless connections, such as Wi-Fi, Bluetooth, long-term evolution (LTE), and the like, as well as any combination thereof. Communications between the circuit-slicing device 210 and the third-party server 220 may be encrypted, compressed, or both, including to various degrees, where such encryption and compression may be performed by the circuit-slicing device 210, the third-party server 220, or both, as well as the various components and sub-components thereof.

The processor 216 is a processor configured to execute one or more functions or instructions relevant to the operation of the secure device. The processor may be implemented as one or more hardware logic components including, without limitation, field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The trusted memory 212 and untrusted memory 214 provide short-term and long-term storage of various data features relevant to the operation of the circuit-slicing device 210. Each of the trusted memory 212 and untrusted memory may be volatile (e.g., random access memory, etc.), non-volatile (e.g., read only memory, flash memory, etc.), or a combination thereof. Further, the trusted memory 212, the untrusted memory 214, or both, may be configured to store software for implementing one or more embodiments disclosed herein. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processor 216, cause the processor 216 to perform the various processes described herein.

The trusted memory 212 may be configured to function as an isolated, encrypted, or otherwise-protected memory unit, providing for security of stored data, functions, and the like, against outside parties or processes. The untrusted memory 214 may be configured to provide for functionalities similar or identical to those provided by the trusted memory 212, without the inclusion of one or more of the security features included in the trusted memory 212. Further, the untrusted memory 214 may be implemented as a memory component or device external to the circuit-slicing device 210.

The third-party server 220 is a device or server connected to the circuit-slicing device by one or more of the means described hereinabove. The third-party server 220 may provide one or more functionalities including, without limitation, transmission of instructions to the circuit-slicing device 210, collection of outputs or data from the circuit-slicing device 210, queueing of data for processing by the circuit-slicing device 210, execution of status functions relevant to the circuit-slicing device 210, such as functions configured to determine whether the circuit-slicing device 210 is in use, other, like, functionalities, and any combination thereof. The third-party server 220 may include, or may be included in, an external secure device, such as the other secure device, 320, of FIG. 3, below.

Figure 3:
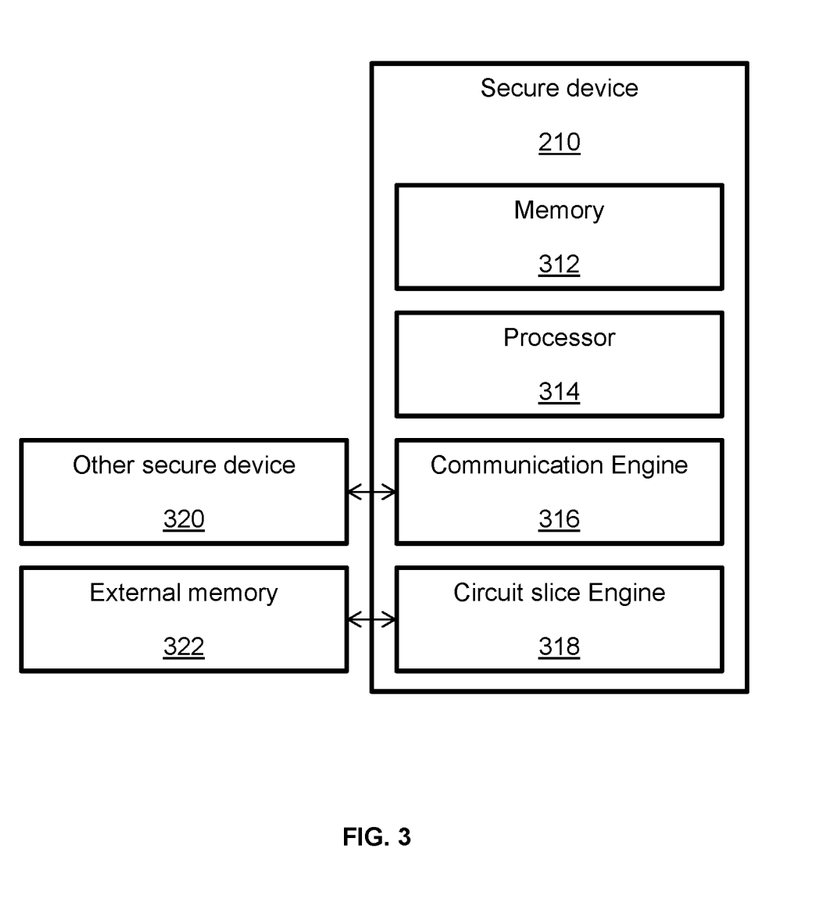
FIG. 3 is a network diagram depicting relationships between components of a circuit-slicing device and various external devices, according to an embodiment.

FIG. 3 is an example network diagram 300 depicting relationships between components of a circuit-slicing device and various external devices, according to an embodiment. The depicted secure device 310 may be a circuit-slicing device, such as is described herein, which may be configured to execute one or more of the methods described hereinbelow. The secure device 310 may be configured to include a memory 312, a processor 314, a communication engine 316, a circuit slice engine 318, and the like, as well as any combination thereof. A circuit-slicing device is described with respect to FIG. 7, below. While the various components of the secure device 310 are depicted as hardware components, it may be understood that the various components may be implemented as hardware components, virtualized components, or hybrid physical-virtual components, without loss of generality or departure from the scope of the disclosure.

The memory 312 may be a memory or storage component configured to retain one or more data features relevant to the operation of the secure device 310. The memory may be configured as trusted memory, similar or identical to the trusted memory, 212, of FIG. 2, above. The memory 312 may be configured as long-term storage, short-term storage, and any combination thereof. The memory 312 may be further configured to store encrypted data, unencrypted data, partially encrypted data, and any combination thereof, and to further encrypt such stored data. Further, the memory 312 may be configured to provide for compression of stored data and storage of compressed data, uncompressed data, and partially compressed data.

The processor 314 is a hardware processing element 314 configured to execute one or more functions or instructions relevant to the operation of the secure device 310. The processor may be implemented as one or more hardware logic components including, without limitation, field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The communication engine 316 is a hardware component configured to provide for the exchange of data with a communication engine 316 included in another secure device 320. The other secure device may be a device similar or identical to the secure device 210. The communication engine 316 may be configured to exchange data with the communication engine 316 of the other secure device 320 via one or more means including, without limitation, wired means, such as universal serial bus (USB), ethernet, and the like, wireless means, such as Wi-Fi, Bluetooth, long-term evolution (LTE), and the like, as well as other, like, means, and any combination thereof. Further, the communication engine 316 may be configured to receive, transmit, or both receive and transmit, encrypted data, compressed data, or encrypted and compressed data, including data encrypted, compressed, or both, to various degrees. In addition, the communication engine 316 may be configured to compress data, to encrypt data, or both, including data at rest and data in motion.

The circuit slice engine 316 is a hardware component configured to execute circuit slicing processes, circuit slice processing methods, and the like, as well as any combination thereof, including, without limitation, those methods described hereinbelow. The circuit slice engine 318 may include one or more processing sub-components, including sub-components similar or identical to those described with respect to the processor 314, other, like, sub, components, and any combination thereof. The circuit slice engine 318 may be configured to connect to an external memory component 322, system, or device via one or more means, including wired connections, wireless connections, and any combination thereof. The circuit slice engine 318 may be configured to send data to the external memory 322, to receive data from the external memory 322, or to both send and receive data, including simultaneously, where such data may be encrypted to various degrees, compressed to various degrees, or both, including by the circuit slice engine 318.

The external memory 322 may be a memory or storage device or component external to the secure device 310 and connected to the circuit slice engine 318, as described. The external memory may be configured to provide for storage of data relevant to the operation of the circuit slice engine 318, including short-term storage, long-term storage, and any combination thereof. Further, the external memory may be configured as an untrusted memory unit similar or identical to the untrusted memory, 214, of FIG. 2, above.

Figure 4:
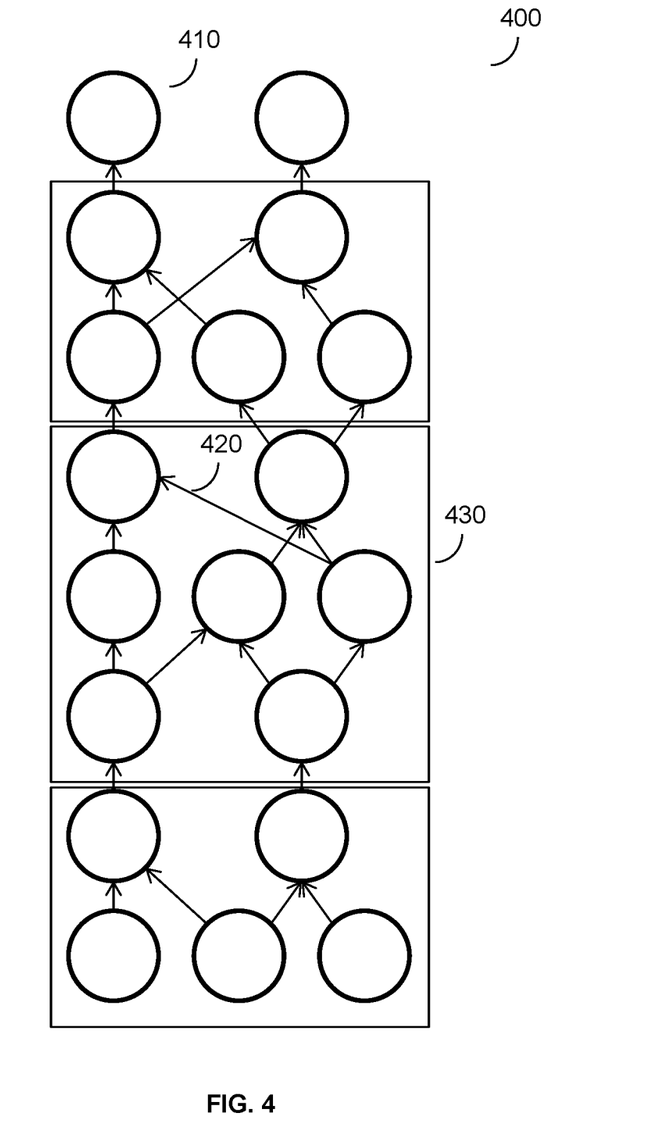
FIG. 4 is an illustration depicting a sliced circuit, according to an embodiment.

FIG. 4 is an example illustration depicting a sliced circuit 400, according to an embodiment. The sliced circuit 400 includes the various gates 410 and links 420 of a Boolean circuit, such as is described with respect to FIG. 1a, above, segmented into multiple, sequential slices 430. The various slices 430 include both self-contained gates 410 and links 420, as well as links 420 which connect the slices 430, providing for the application of the outputs yielded by gates included in a first slice 430 as inputs to gates included in subsequent slices 430. Circuit slices 430 may be generated by a circuit-slicing device, as described herein, operating in "circuit-slicing mode," wherein such a device may accept, as inputs in the slicing of circuits, a description of a function to be sliced, a Boolean circuit representing the function to be sliced, other, like, inputs, and any combination thereof. Circuit slices 430 may be determined and generated according to one or more patterns, sub-circuit properties, other, like, factors, and any combination thereof. Where circuit slices are determined and generated based on sub-circuit patterns, slicing may include identification of repetitive patterns of operation in a provided function, and determination that sub-circuits including such patterns are to be grouped as individual slices 430. Further, generating a sliced circuit may include manual specification of sub-circuit slices and order of slice processing, as well as other, like, methods, and any combination thereof. It may be understood that while only one of each of the gates 420, links 420, and slices 430 are shown for purposes of simplicity, other, similar features may be similarly labeled without loss of generality or departure from the scope of the disclosure.

Figure 5:
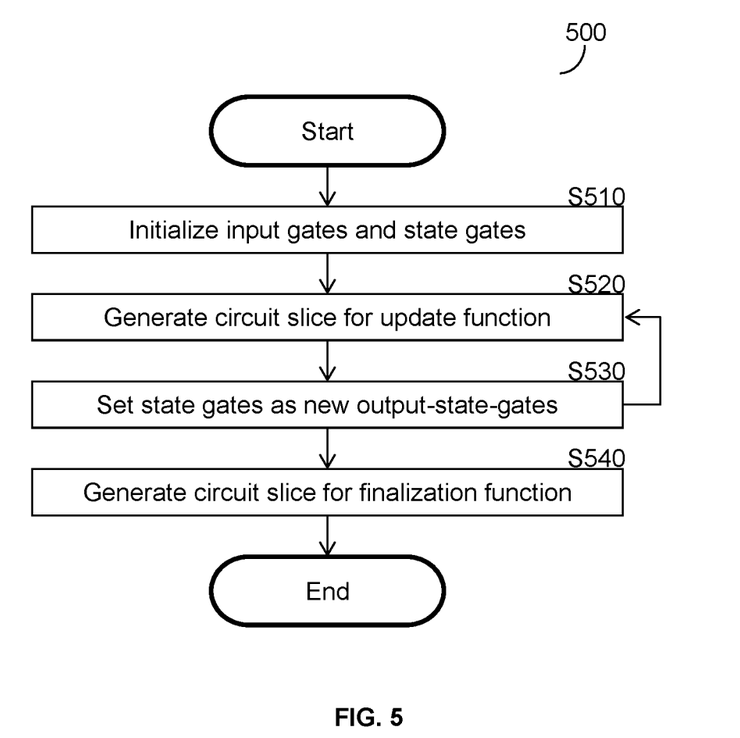
FIG. 5 is a flowchart depicting a process for generating circuit slices, according to an embodiment.

FIG. 5 is an example flowchart 500 depicting a process for generating circuit slices, according to an embodiment. The method described with respect to FIG. 5 may be executed by a circuit-slicing device, such as is described hereinabove, as well as by other, like, devices, and any combination thereof. It may be understood that while the processes described with respect to FIG. 5 are described with respect to sequential circuit slices, other, non-linear arrangements of circuit slices may be likewise generated by application of such processes.

At S510, input gates and state gates are initialized. As described with respect to FIGS. 1A-1C, above, input gates are gates configured to contain or receive input values, on which values a Boolean circuit may operate to produce an output. Similarly, state gates are gates configured to accept one or more input values, either from input gates or other state gates, and to output one or more output values, where such output values may be equal to the accepted input values, modified by one or more logical operators, functions, or the like, as well as any combination thereof. Input and state gates may be initialized in one or more orders by application of various functions and techniques, where such techniques may be configured to generate Boolean circuits from input functions or algorithms.

At S520, a circuit slice is generated for an update function. As described with respect to FIG. 4, circuits may be sliced by application of one or more algorithms or methods configured to identify and slice patterns within an input function, by application of manual review and slice designation, by other, like, methods, and any combination thereof. Update functions may be functions, which may be represented as sub-circuits, which provide outputs, where such outputs are applied as inputs to subsequent update functions. The inputs of an update function may include, without limitation, input gates, output-state-gate outputs of other update functions, and the like, as well as any combination thereof.

At S530, state gates are set as new output-state-gates. State gates may be set as new output-state-gates where the outputs of the given state gates are applied as inputs for state gates in a subsequent slice, as opposed to application as inputs for state gates in the same slice.

Execution of S520 and S530 may be repeated twice or more, where repetition of S520 and S530 provides for repeated updating to a next state, according to a current state and input.

At S540, a circuit slice is generated for a finalization function. A finalization function may be a function, which may be represented as a sub-circuit, the outputs of which are terminal gates, additionally referred to as "final output gates." The values of such terminal gates may be the outputs of the final state gates included in the finalization function. Further, the inputs of the finalization function may be the outputs, or a subset thereof, of various update functions, as described hereinabove. Further, in an embodiment, the inputs of a finalization function may be input gates.

Figure 6A:
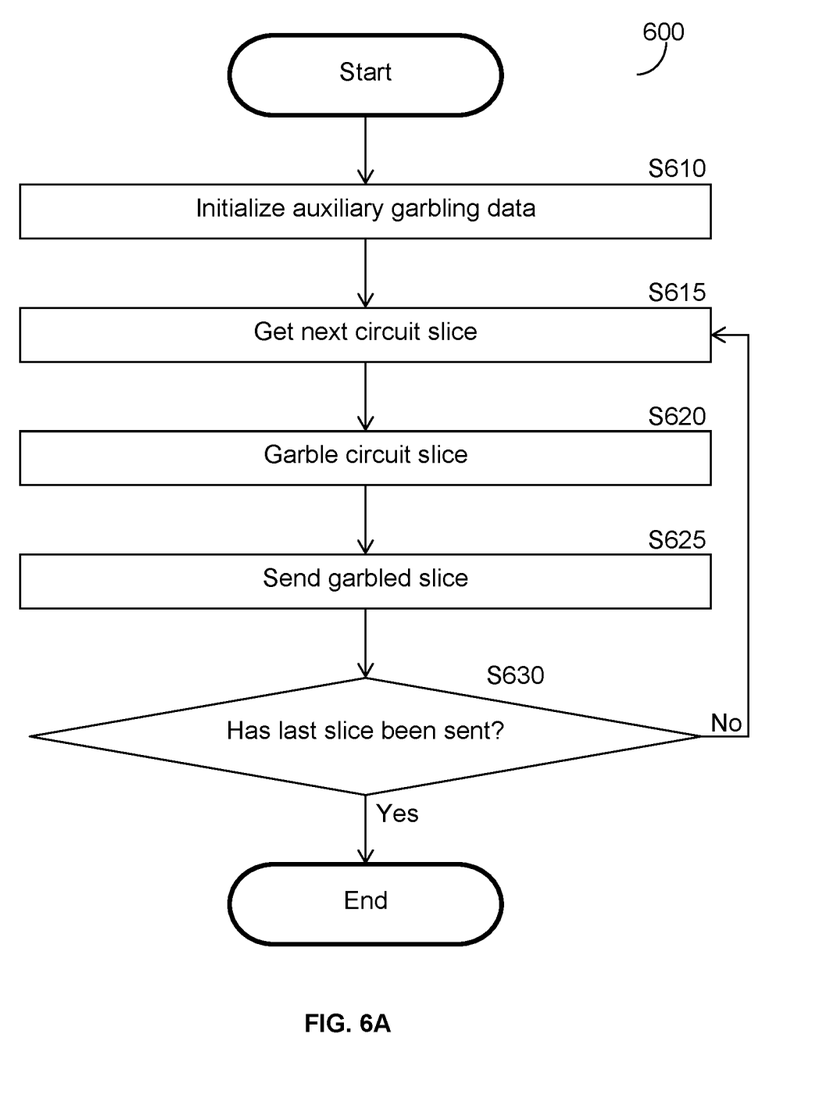
FIG. 6A is a flowchart depicting a process for garbling circuit slices, according to an embodiment.

FIG. 6A is an example flowchart 600 depicting a process for garbling circuit slices, according to an embodiment. The method described with respect to FIG. 6A may be executed by a circuit-slicing device, such as is described hereinabove, as well as by other, like, devices, and any combination thereof. The described method of circuit slice garbling may provide for a reduction in memory requirements when compared with single-stage garbling of entire circuits, providing for adaptation of garbled circuit techniques to TEE systems and other, like, memory-limited implementations.

At S610, auxiliary garbling data is initiated. Auxiliary garbling data includes data features relevant to the execution of garbling operations on circuit slices. Auxiliary garbling data may include, as examples and without limitation, randomly-generated seed values, garbling functions or algorithms, applicable constants and variables, known slice orders, other, like, data features, and any combination thereof. Initiation of auxiliary garbling data may include generation of one or more features, collection of one or more features from memory, storage, and other, like, components and sources, other, like, initiating operations, and any combination thereof.

At S615, a next circuit slice is obtained. A next circuit slice may be obtained by one or more means including, without limitation, generation of a circuit slice, collection of a circuit slice, and the like, as well as any combination thereof. Where a next circuit slice is obtained by generation, the next circuit slice may be generated by methods similar or identical to those described with respect to FIG. 5, by other, like, means, and any combination thereof. Where a next circuit slice is obtained by collection, the circuit slice may be collected from a repository of pre-computed circuit slices stored in an external memory or storage device or component, another, like, memory or storage device or component, and the like, as well as any combination thereof.

At S620, the circuit slice is garbled. A circuit slice may be garbled by application of one or more garbling functions or techniques, such as those described with respect to FIG. 1b, above. Garbling of a circuit slice at S620 may include garbling of the individual gates included in the slice into garbled gates, as described above, including garbling in depth-first order and creation of gate-specific encryption tables.

At S625, the garbled slice is sent. Sending the garbled slice may include transmitting the garbled slice, various associated data features, and the like, as well as any combination thereof, to one or more destination devices, components, or systems. The garbled slice may be sent via one or more means including, without limitation, those described with respect to FIGS. 2 and 3, above. Sending of a garbled slice at S625 may include compression, encryption, or both compression and encryption, of the garbled slice, including to various degrees. In addition, sending of a garbled slice at S625 may include storage of the garbled slice to a memory or storage component, including, without limitation, an external, "unsafe," memory, and the like, as well as any combination thereof.

At S630, it is determined whether the last slice has been sent. Whether the las slice has been sent may be determined based on one or more analyses including, without limitation, analysis of pending slice queues, analysis of slice numbers or orders, receipt and analysis of last-slice signals from external sources, analysis of whether the most-recently-processed slice represents a finalization function or includes terminal gates, as described with respect to S540 of FIG. 5, above, and the like, as well as any combination thereof.

Where, at S630, it is determined that the last slice has been sent, execution terminates. Where, at S630, it is determined that the last slice has not been sent, execution resumes with S615.

Figure 6B:
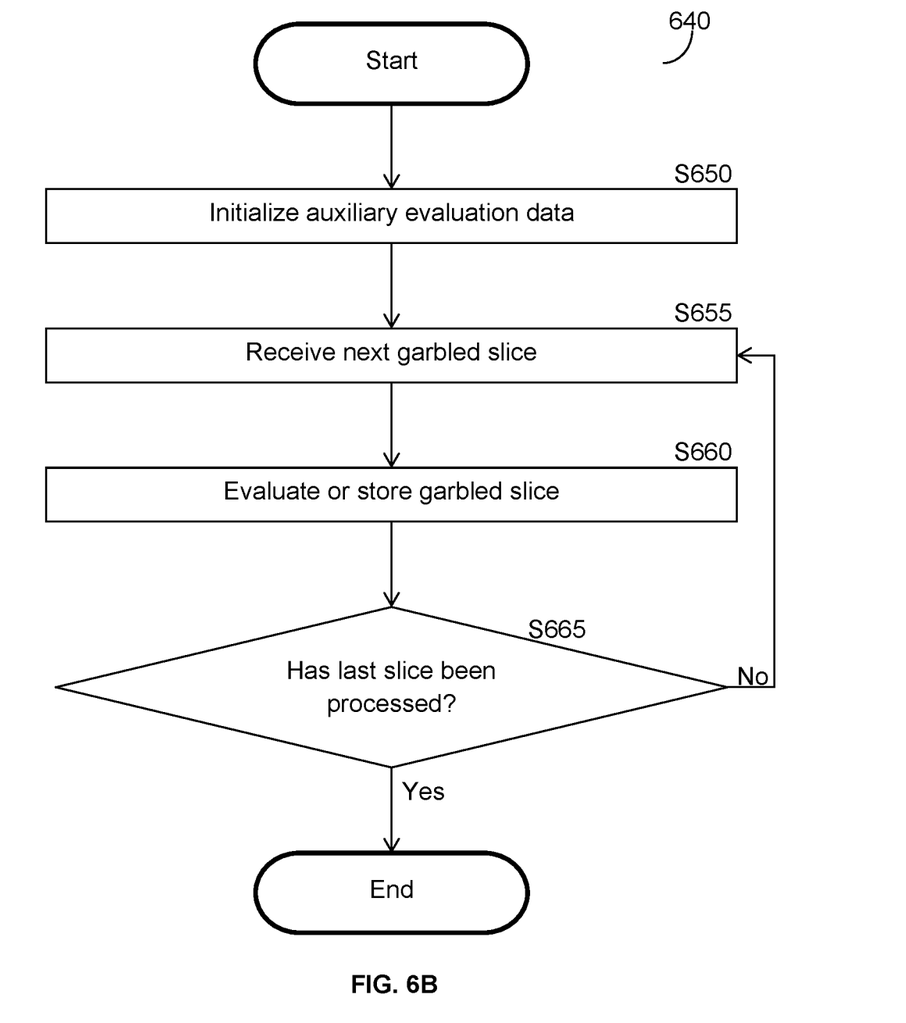
FIG. 6B is a flowchart depicting a process for processing garbled slices, according to an embodiment.

FIG. 6B is an example flowchart 640 depicting a process for processing garbled slices, according to an embodiment. The method described with respect to FIG. 6B may be executed by a circuit-slicing device, such as is described hereinabove, as well as by other, like, devices, and any combination thereof. Further, the method described with respect to FIG. 6b may be executed from a second circuit-slicing device, or the like, distinct from the device or system executing the method described with respect to FIG. 6A. The described method of garbled circuit evaluation may provide for a reduction in memory requirements when compared with single-stage evaluation of entire garbled circuits, providing for adaptation of garbled circuit techniques to TEE systems and other, like, memory-limited implementations.

At S650, auxiliary evaluation data is initialized. Auxiliary evaluation data includes data features relevant to the execution of evaluation operations on garbled circuit slices. Auxiliary evaluation data may include, as examples and without limitation, randomly-generated seed values, evaluation functions or algorithms, applicable constants and variables, known slice orders, other, like, data features, and any combination thereof. Initiation of auxiliary evaluation data may include collection of one or more features from memory, storage, and other, like, components and sources, other, like, initiating operations, and any combination thereof.

At S655, a next garbled slice is received. The next garbled slice may be received from a device or system executing the process described with respect to FIG. 6A. The next garbled slice may be a garbled circuit slice similar or identical to that sent at S625 of FIG. 6a, above. In addition, receiving a garbled slice at S625 may include collection of the garbled slice from a memory or storage component, including, without limitation, collection from an external, "unsafe," memory, and the like, as well as any combination thereof.

At S660, the garbled slice is evaluated or stored. Garbled slices may be evaluated, at S660, via one or more evaluation techniques similar or identical to those described with respect to FIG. 1C, above. Evaluation of garbled slices at S660 may include depth-first evaluation of the garbled gates included in the garbled circuit slice, including decryption based on the gates' decryption tables and the auxiliary information initialized at S650, and the like, as well as any combination thereof. Where execution of S660 includes storage of garbled circuit slices, the garbled slices may be stored to one or more memory or storage components or devices, including external "unsafe" memory, and the like, as well as any combination thereof. Further, in an embodiment, S660 may further include evaluation according to those means described herein, as well as storage of a copy of the slice, as a garbled slice, as an evaluated slice, or both, to one or more memory or storage components, such as those described herein.

At S665, it is determined whether the last slice has been processed. Whether the last slice has been processed may be determined based on one or more analyses including, without limitation, analysis of pending slice queues, analysis of slice numbers or orders, receipt and analysis of last-slice signals from external sources, analysis of whether the most-recently-processed slice represents a finalization function or includes terminal gates, as described with respect to S540 of FIG. 5, above, and the like, as well as any combination thereof.

Where, at S665, it is determined that the last slice has been processed, execution terminates. Where, at S665, it is determined that the last slice has not been processed, execution continues with S655.

Figure 7:
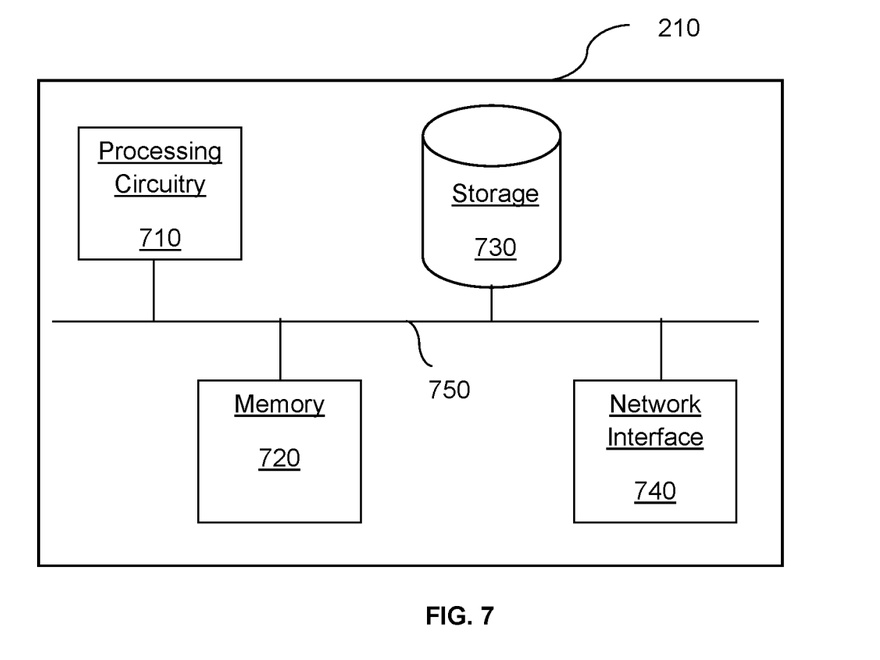
FIG. 7 is a hardware block diagram depicting a circuit-slicing device, according to an embodiment.

FIG. 7 is an example hardware block diagram 700 depicting a circuit-slicing device 210, according to an embodiment. The circuit-slicing device 210 includes a processing circuitry 710 coupled to a memory 720, a storage 730, and a network interface 740. In an embodiment, the components of the circuit-slicing device 210 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or another memory technology, compact disk-read only memory (CD-ROM), Digital Versatile Disks (DVDs), or any other medium which can be used to store the desired information.

The network interface 740 allows the circuit-slicing device 210 to communicate with the various components, devices, and systems described herein for processing Boolean and garbled circuits in memory-limited environments, as well as other, like, purposes.

It should be understood that the embodiments described herein are not limited to the specific architecture illustrated in FIG. 7, and other architectures may be equally used without departing from the scope of the disclosed embodiments.

It should be noted that the computer-readable instructions may be construed broadly to mean any type of instructions, whether referred to as software, firmware, middleware, microcode, hardware description language, or otherwise. Instructions may include code, such as in source code format, binary code format, executable code format, or any other suitable format of code. The instructions, when executed by the circuitry, cause the circuitry to perform the various processes described herein.

It may be appreciated that, while the systems and methods described herein are presented with respect to Boolean circuits, the same may be applicable to various arithmetic circuits, such as those including gates consisting of operations over mathematical fields or rings, without loss of generality or departure from the scope of the disclosure.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units (CPUs), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for use in garbling a circuit in a memory-limited environment, comprising:
 initializing a plurality of input gates and a plurality of state gates;
 generating a circuit slice for an update function;
 garbling the generated circuit slice for the update function, wherein the garbled generated circuit slice for the update function is garbled such that it can be evaluated by an evaluator without the evaluator having to receive information specifically regarding the garbled generated circuit slice for the update function;
 setting the plurality of state gates as a plurality of new output-state-gates;
 generating a circuit slice for a finalization function, wherein the finalization function represented by a sub-circuit, the outputs of which are terminal gates; and
 garbling the generated circuit slice for the finalization function, wherein the generated circuit slice for the finalization function is garbled such that it can be evaluated by the evaluator without the evaluator having to receive information specifically regarding the garbled generated circuit slice for the finalization function.

2. The method of claim 1, wherein values of the terminal gates are the outputs of a plurality of final state gates of the plurality of the state gates included in the finalization function.

3. The method of claim 1, wherein inputs of the finalization function are outputs of at least one update function.

4. The method of claim 1, wherein inputs of the finalization function are provided by the plurality of the input gates.

5. The method of claim 1, further comprising:
 initializing auxiliary garbling data comprising a plurality of data features associated with execution of garbling operations for the entirety of the circuit being garbled prior to initializing the plurality of input gates and the plurality of state gates.

6. The method of claim 1, further comprising:
 initializing at an evaluator auxiliary evaluation data comprising a plurality of data features associated with execution of evaluation operations on the garbled circuit.

7. The method of claim 6, further comprising:
 responsive to receiving a next garbled slice, evaluating the next garbled slice based on the initializing auxiliary evaluation data.

8. A non-transitory computer readable medium having stored thereon instructions for causing a processing circuitry to perform a process for use in garbling a circuit in a memory-limited environment, the process comprising:
 initializing a plurality of input gates and a plurality of state gates;
 generating a circuit slice for an update function;
 garbling the generated circuit slice for the update function, wherein the garbled generated circuit slice for the update function is garbled such that it can be evaluated by an evaluator without the evaluator having to receive information specifically regarding the garbled generated circuit slice for the update function;

setting the plurality of state gates as a plurality of new output-state-gates;

generating a circuit slice for a finalization function, wherein the finalization function represented by a sub-circuit, the outputs of which are terminal gates; and garbling the generated circuit slice for the finalization function, wherein the generated circuit slice for the finalization function is garbled such that it can be evaluated by the evaluator without the evaluator having to receive information specifically regarding the garbled generated circuit slice for the finalization function.

9. A system for use in garbling a circuit in a memory-limited environment, comprising:

a processing circuitry; and a memory, the memory containing instructions that, when executed by the processing circuitry, configure the system to:

initialize a plurality of input gates and a plurality of state gates;

generate a circuit slice for an update function;

garble the generated circuit slice for the update function, wherein the garbled generated circuit slice for the update function is garbled such that it can be evaluated by an evaluator without the evaluator having to receive information specifically regarding the garbled generated circuit slice for the update function;

set the plurality of state gates as a plurality of new output-state-gates;

generate a circuit slice for a finalization function, wherein the finalization function represented by a sub-circuit, the outputs of which are terminal gates; and garble the generated circuit slice for the finalization function, wherein the generated circuit slice for the finalization function is garbled such that it can be evaluated by the evaluator without the evaluator having to receive information specifically regarding the garbled generated circuit slice for the finalization function.

10. The system of claim 9, wherein values of the terminal gates are the outputs of a plurality of final state gates of the plurality of the state gates included in the finalization function.

11. The system of claim 9, wherein inputs of the finalization function are outputs of at least one update function.

12. The system of claim 9, wherein inputs of the finalization function are provided by the plurality of the input gates.

13. The system of claim 9, further comprising the instructions that, when executed by the processing circuitry, configure the system to:

initialize auxiliary garbling data comprising a plurality of data features associated with execution of garbling operations for the entirety of the circuit being garbled prior to initializing the plurality of input gates and the plurality of state gates.

14. The system of claim 13, further comprising the instructions that, when executed by the processing circuitry, configure the system to:

initialize auxiliary evaluation data comprising a plurality of data features associated with execution of evaluation operations on the garbled circuit slice.

15. The system of claim 9, further comprising the instructions that, when executed by the processing circuitry, configure the system to:

evaluate the next garbled slice based on the initializing auxiliary evaluation data, responsive to receiving a next garbled slice.

* * * * *